Sly & Ford,
Provision Safe.
No. 99,606.          Patented Feb. 8, 1870.

Witnesses:
M. Vorlaender
Edgar Tate

Inventor:
J. Sly
S. S. Ford
Per Munn & Co.
Attorneys.

United States Patent Office.

AUSTIN SLY AND SAMUEL S. FORD, OF LEBANON, NEW HAMPSHIRE.

Letters Patent No. 99,606, dated February 8, 1870.

IMPROVED ROTARY PROVISION-SAFE.

The Schedule referred to in these Letters Patent and making part of the same.

To all whom it may concern:

Be it known that we, AUSTIN SLY and SAMUEL S. FORD, of Lebanon, in the county of Grafton, and State of New Hampshire, have invented a new and improved Rotary Provision-Safe; and we do hereby declare that the following is a full, clear, and exact description thereof, which will enable others skilled in the art to make and use the same, reference being had to the accompanying drawing, forming part of this specification.

Similar letters of reference indicate corresponding parts.

Figure 1:
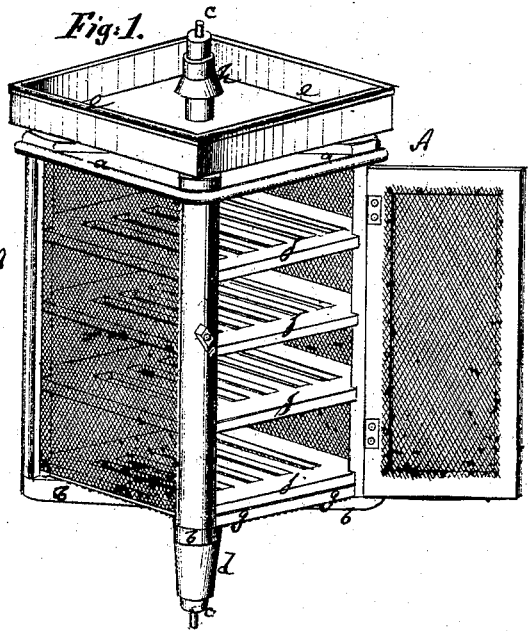
Figure 1 represents a perspective view of my improved safe.
Figure 2:
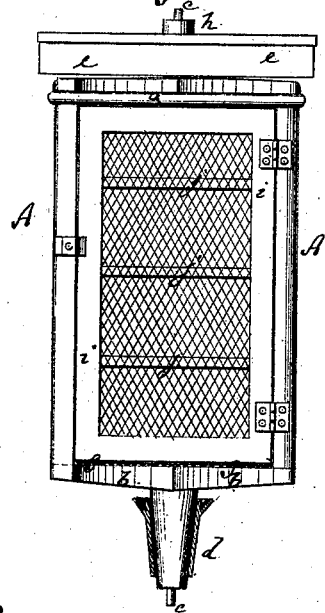
Figure 2 is a side view of the same.

This invention has for its object to construct an airy, convenient provision-safe, which cannot be entered by rats, mice, or insects, and which will at all times remain clean and in good order.

The screen A is made prismatic, having four, more or less, sides, which are secured to the polygonal top and bottom plates $a\ b$.

From the top and bottom plates project pins $c\ c$, upward and downward respectively, which constitute the pivots for receiving the screen in a stationary frame.

By this arrangement, the screen is allowed to revolve.

Around the lower pin $c$ is fitted a metallic cup, $d$, which may be filled with liquid or other matter, to prevent animals from climbing up to the screen.

Upon the top of the screen is placed a pan, $e$, about as large as the top plate, $a$. It may also be filled with water, to destroy insects or other animals that may drop from the ceiling upon the screen, or may at least serve to prevent their gnawing through the top plate.

The sides of the screen are formed of gauze or other perforated material.

The shelves $j\ j$ in it are also perforated, so that crumbs may fall through them upon a sliding shelf, $g$, secured upon the bottom $b$ of the screen.

The shelf $g$, which is either solid or made of gauze, can at any time be drawn out to discharge the matter collected upon it.

An inverted cup, $h$, may be arranged upon the upper pin $c$, to prevent the animals in the pan from climbing out again.

The screen may have one or more of its sides formed into doors, $i$.

Having thus described our invention,

We claim as new, and desire to secure by Letters Patent—

The revolving screen, containing the cup $d$, pan $e$, shelves $j\ j$, sliding shelf $g$, and door or doors $i$, all arranged and combined substantially as herein shown and described.

AUSTIN SLY.
SAML. S. FORD.

Witnesses:
   E. J. DURANT,
   G. E. DURANT.